(12) United States Patent
Martinez

(10) Patent No.: US 7,263,072 B2
(45) Date of Patent: Aug. 28, 2007

(54) SYSTEM AND METHOD FOR SELECTING A COMMUNICATION BAND

(75) Inventor: Paul Martinez, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 933 days.

(21) Appl. No.: 10/417,784

(22) Filed: Apr. 16, 2003

(65) Prior Publication Data

US 2004/0208137 A1 Oct. 21, 2004

(51) Int. Cl.
*H04L 5/14* (2006.01)
(52) U.S. Cl. .................................. 370/276; 370/297
(58) Field of Classification Search ................ 370/275, 370/276, 279, 293, 297
See application file for complete search history.

(56) References Cited

U.S. PATENT DOCUMENTS 6,667,723 B2* 12/2003 Forrester .................... 343/858

2003/0008667 A1 1/2003 Forrester
2003/0181192 A1* 9/2003 Park et al. .................. 455/335

FOREIGN PATENT DOCUMENTS

WO    WO 01/59938 A2    8/2001

* cited by examiner

*Primary Examiner*—Brenda Pham

(57) ABSTRACT

A system and method for making a band selection in a wireless communications device is provided. The available bands include a first-communication band, a second communication band, and an auxiliary band. A wideband diplexer provides a wideband path, which includes the first-communication band and the auxiliary band, and a second-communication band path. A combination duplexer couples to the wideband path, and has an auxiliary signal port, a first-band receive port, and a first-band transmit port. A standard duplexer couples to the second communication path to provide a second-band receive port and a second-band transmit port. In one example, the first communication band is the PCS band, the second communication band is the cellular band, and the auxiliary signal is a GPS satellite signal.

15 Claims, 7 Drawing Sheets

SYSTEM AND METHOD FOR SELECTING A COMMUNICATION BAND

This application relates to U.S. patent application Ser. No. 10/417,881, entitled "An N-Plexer for use in a Wireless Communications Device" and filed Apr. 16, 2003, and U.S. patent application Ser. No. 10/417,880, entitled "A Triplexer for use in a Wireless Communications Device" and filed Apr. 16, 2003, both of which are incorporated herein by reference.

BACKGROUND

The present invention generally relates to the field of wireless communication devices, and more particularly to devices adapted for communication on one or more communication bands and an auxiliary band.

Wireless communications systems generally have base stations and antennas which communicate with mobile wireless devices. These wireless devices may accommodate voice communication as well as data communication. For example, the wireless devices may be mobile phones, personal data assistants, or laptop computers. Since they are portable, the wireless devices are usually powered by a battery, and need to be sized for convenient use. Most commercial wireless communication systems comply with some international standard to assure compatibility between the base station and the mobile devices. However, since there are several communication standards, mobile devices can only communicate in a compatible communication system. Since this has been found to be too limiting, mobile wireless devices are often adapted to operate in more than one communication system.

Wireless communication systems are generally arranged to operate in particular frequency range or communication band. For example, one communication system may operate in the PCS band, which operates in frequency band at approximately 1900 MHz. Another communication system may operate in the cellular band, which operates in frequency band at approximately 800 MHz. It has been found to be desirable to have mobile wireless devices capable of operating at multiple communication bands, and thereby able to operate on multiple communication systems. For example, it has been found particularly useful to have wireless mobile devices capable of operating on both the PCS and cellular systems. It will be appreciated that other frequency bands and communications standards may be used.

It has also been found desirable that a mobile wireless device be constructed to receive an auxiliary signal. A particularly useful auxiliary signal is the position location information signal provided by a GPS satellite system. In the GPS system, several satellites transmit a location beacon at about 1575 MHz that may be received by a GPS receiver. The GPS signal contains timing and location information that may be used to determine the location of the GPS receiver. In this way, a mobile wireless device receiving the GPS signal may provide location information for emergency personnel or other applications. However, adding multiple band capability and adding auxiliary signal capability to wireless mobile devices has made these devices more complex and more costly to build.

Even though mobile wireless devices have become more complex, market pressures demand higher performance and lower costs. In this regard, the manufacturing of mobile devices requires trade-offs between loss, noise, and price. For example, a lower loss device may require the use of more costly components. Such a lower loss device would have a longer battery life in a portable device, which is highly desirable in the mobile wireless market. In another example, it may be desirable to make a less costly phone by using fewer or lower quality components. However, such a construction may lead to additional noise in the receive or transmit circuitry, thereby reducing the sensitivity of the phone. Such a reduced sensitivity may lead to poor reception, poor signal quality, dropped calls, or other undesirable performance characteristics. With the increasing push for additional features in the mobile wireless device, there is great market pressure to reduce cost while improving noise and loss characteristics.

A wireless device constructed to operate on multiple communication bands generally has some form of band selection circuitry. In this way the device may communicate on one band, and when conditions warrant a change, switch to communicate on the other band. For example, a mobile phone may operate on the PCS band, but when the phone is moved to a location without a PCS service, then the phone may select to operate on the cellular band, if present. Of course, it would be desirable to allow the mobile phone to receive a GPS signal irrespective of which band is used for voice communication. In this regard, the band selection circuitry should be able to discriminate between at least two communication systems, but yet be able to receive an auxiliary GPS signal, if present. For example, a wireless device may need to selectively operate on the PCS communication system or the cellular communication system while receiving GPS signal information. In arranging band selection circuitry, it is known to use either RF switches or triplexers. As will be discussed more fully below, both RF switches and triplexers each have deficiencies.

Band selection circuitry using RF switches has been disclosed. RF switches have relatively low loss of between about 0.2 and 0.4 db, but the RF switch is an active device, and therefore is likely to add noise in both the transmit and the receive path. In particular, an RF switch is prone to add intermodulation and IP3 noise to the communication signal, which is known to substantially degrade device performance. In band select circuitry using an RF switch, control circuitry sets the RF switch to direct the communication path to a GPS filter and low noise amplifier, or to a diplexer. More particularly, when the mobile device desires position information, the control circuitry sets the RF switch so the antenna couples with the GPS filter and amplifier. When the mobile device needs to communicate on one of the two available communication bands, then the control circuitry couples the antenna with the diplexer. The diplexer in turn couples to a pair of duplexers, with each duplexer constructed to provide transmit and receive paths for one of the communication bands. For example, one of the duplexers would be constructed to provide transmit and receive paths for the PCS communication band while the other duplexer would provide transmit and receive paths for the cellular communication band. Unfortunately, the RF switch continuously adds noise into the communication paths, and also contributes to increased insertion loss. Further, RF switches are a relatively costly electronic component.

In designs where cost is a major consideration, the band selection circuitry may use a triplexer instead of an RF switch. Unfortunately, some common triplexers are inherently lossy and therefore may contribute to a higher overall insertion loss for the wireless mobile device. Such a high insertion loss may lead to shorter battery life and degraded signal quality for the mobile device. It may be possible to build triplexers with better loss characteristics, but these devices are often constructed to be relatively large and therefore consume valuable and limited circuit area in a wireless device. However, since the triplexer is a passive device, it has better noise characteristics than the RF switch. In use, a band selection circuit using a triplexer couples to an antenna, and separates the communication signal into three bands. For example, the first band may be the cellular band, a second band may be the PCS band, and the third band may be the GPS band. The triplexer couples to two duplexers, with each duplexer constructed to provide a receive and transmit path for its associated band. For example, a cellular duplexer connects to the cellular output of the triplexer, and a PCS duplexer connects to the PCS output of the triplexer. A filter couples to the GPS output of the triplexer and passes a low-level GPS signal, which then is amplified in a low noise amplifier. Often, the GPS filter is a SAW (surface acoustic wave) filter.

In another known example of band selection circuitry, the antenna couples to a standard diplexer where a cellular communication path and a PCS communication path are established. The diplexer couples to a cellular duplexer and to a PCS duplexer for providing transmit and receive paths for each band. A separate GPS circuit also couples to the antenna for detecting the GPS signal. The GPS path is tuned so that ideally it appears as an open circuit to cellular communication signals or PCS communication signals. However, such tuning is not precise and typically results in leakage current, which increases insertion loss for the overall device and also degrades the quality of the cellular or PCS signal. Further such an implementation also requires additional components and additional circuit space for detecting the GPS signal.

Therefore, there exists a need for band selection circuitry that provides low loss, low noise injection, compact design, and cost effective implementation.

SUMMARY

Briefly, the present invention provides a system and method for making a band selection in a wireless communications device. The available bands include a first-communication band, a second communication band, and an auxiliary band. A wideband diplexer provides a wideband path, which includes the first-communication band and the auxiliary band, and also provides a second-communication band path. A combination duplexer couples to the wideband path, and has an auxiliary signal port, a first-band receive port, and a first-band transmit port. A standard duplexer couples to the second communication path to provide a second-band receive port and a second-band transmit port.

In an example of the band selection system, the available bands include a PCS (about 1900 MHz) band, a cellular band (about 800 MHz), and a GPS band (about 1575 MHz). A wideband diplexer provides a wideband path, which includes the PCS band and the GPS band, and also provides a cellular band path. A combination duplexer couples to the wideband path, and has a GPS signal port, a PCS receive port, and a PCS transmit port. A standard duplexer couples to the cellular communication path to provide a cellular receive port and a cellular transmit port.

Advantageously, the example band selection system and method may provide band selection capability using passive devices, so minimal noise is injected. Such low noise characteristics contribute to superior signal to noise ratios, improved reception, better quality wireless communications, and fewer dropped calls. Also, since no RF switch or triplexer is used, and the separate GPS filter may be eliminated, the example band selection system has advantageous insertion loss parameters. Low insertion loss results in longer battery life and improved device performance. Finally, the band selection system may be realized using a few cost effective and relatively small components, enabling a cost effective implementation.

These and other advantages will become apparent by review of the figures and detail descriptions that follow.

DETAILED DESCRIPTION

Figure 1:
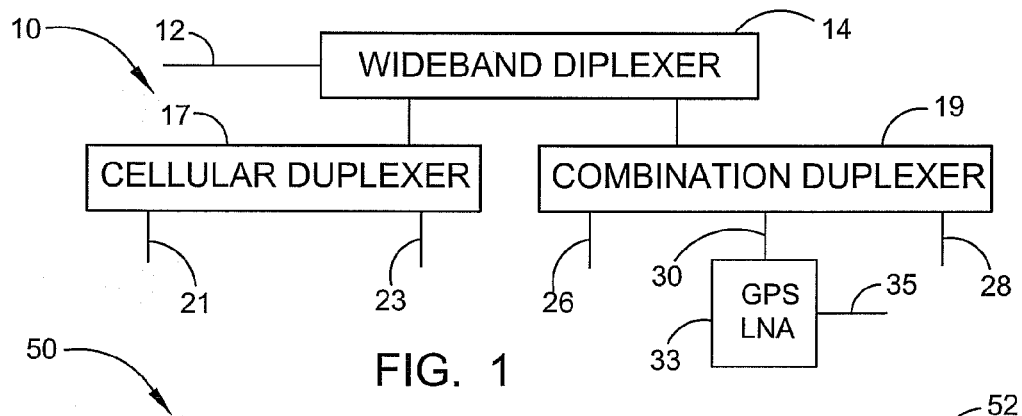
FIG. 1 is a block diagram of a band selection system in accordance with the present invention.

Referring now to FIG. 1 a band selection system 10 is illustrated. Band selection system 10 operates in a wireless communications device. The wireless communication device could be, for example, a mobile wireless unit for communicating in a communication system. The mobile wireless device is typically battery powered for increased portability, and may provide for voice or data communication. The wireless communication system typically operates in compliance with an international standard, with the standard defining the frequency range, or band, that the device will communicate on. For example, the communication system may be PCS, cellular, GSM, or other communication standard, with each standard operating a different communication band. For increased flexibility, a mobile wireless device is often adapted to operate on more than one communication band. For example, a wireless mobile phone may be enabled to place and receive calls on either the PCS band or the cellular band. If the wireless mobile device is operating in an area where more than one of the available bands is present, then the mobile wireless device uses a priority table to determine which band to prefer. The mobile wireless device not only may operate on multiple communication bands, but the mobile wireless device may also need to receive an auxiliary signal, such as a GPS position location signal. Accordingly, the band selection system 10 enables a wireless communication device to efficiently select a communication band and also receive an auxiliary signal.

The band selection system 10 is a specific example circuit adapted to enable a wireless device to select a communication channel on either the PCS communication band or the cellular communication band. If a GPS signal is received, the band selection circuit also provides a GPS signal output. Although the band selection system 10 is adapted to the PCS, cellular, and GPS bands, it will be understood that other bands may be used.

The band selection system 10 has an antenna port 12 coupled to an antenna (not shown). The antenna is constructed to receive signals at the expected frequencies of the available communication bands. For example, the antenna may be a dual-band antenna capable of receiving a PCS band signal and a cellular band signal. The antenna port 12 is coupled to a wide band diplexer 14. The wide band diplexer enables two communication paths from the antenna port. A first path couples the wide band diplexer 14 to a combination duplexer 19, which will be described in detail in a following section. The first path carries a wide band signal that may include a PCS communication signal and a GPS signal. The combination duplexer separates the wide band signal into a PCS receive path 26 and a PCS transmit path 28. The PCS receive path 26 and the PCS transmit path 28 then couple to other transceiver circuitry for receiving and transmitting on the PCS band. Of course, communicating on the PCS band requires the presence of a compatible PCS base station and communication system. The combination duplexer also provides a GPS output 30. The GPS output 30 contains GPS information received from a GPS communication signal, if the antenna detects a GPS signal of sufficient strength. The GPS output 30 may couple to a GPS low noise amplifier 33 for generating an amplified GPS informational signal 35.

The second path from the wide band diplexer 14 is received into a standard cellular duplexer 17. The cellular duplexer provides a cellular received path 21 and a cellular transmit path 23. The cellular received path 21 and a cellular transmit path 23 couple to additional transceiver circuitry for receiving and transmitting cellular band communications. Of course, communicating on the cellular band requires the presence of a compatible cellular base station and communication system.

Advantageously, the band selection system 10 may be efficiently and compactly implemented. The band selection system 10 also exhibits low insertion loss and has superior noise characteristics. For example, since the wide band diplexer 14, the combination duplexer 19, and the cellular duplexer 17 are all passive devices, these devices add no significant additional noise to any communication signal. Also, since no RF switch or triplexer is used, and the separate GPS filter may be eliminated, the example band selection system has advantageous insertion loss parameters. Accordingly, band selection system 10 is useful for constructing wireless devices having highly advantageous performance characteristics and lower costs as compared to standard device construction.

Figure 2:
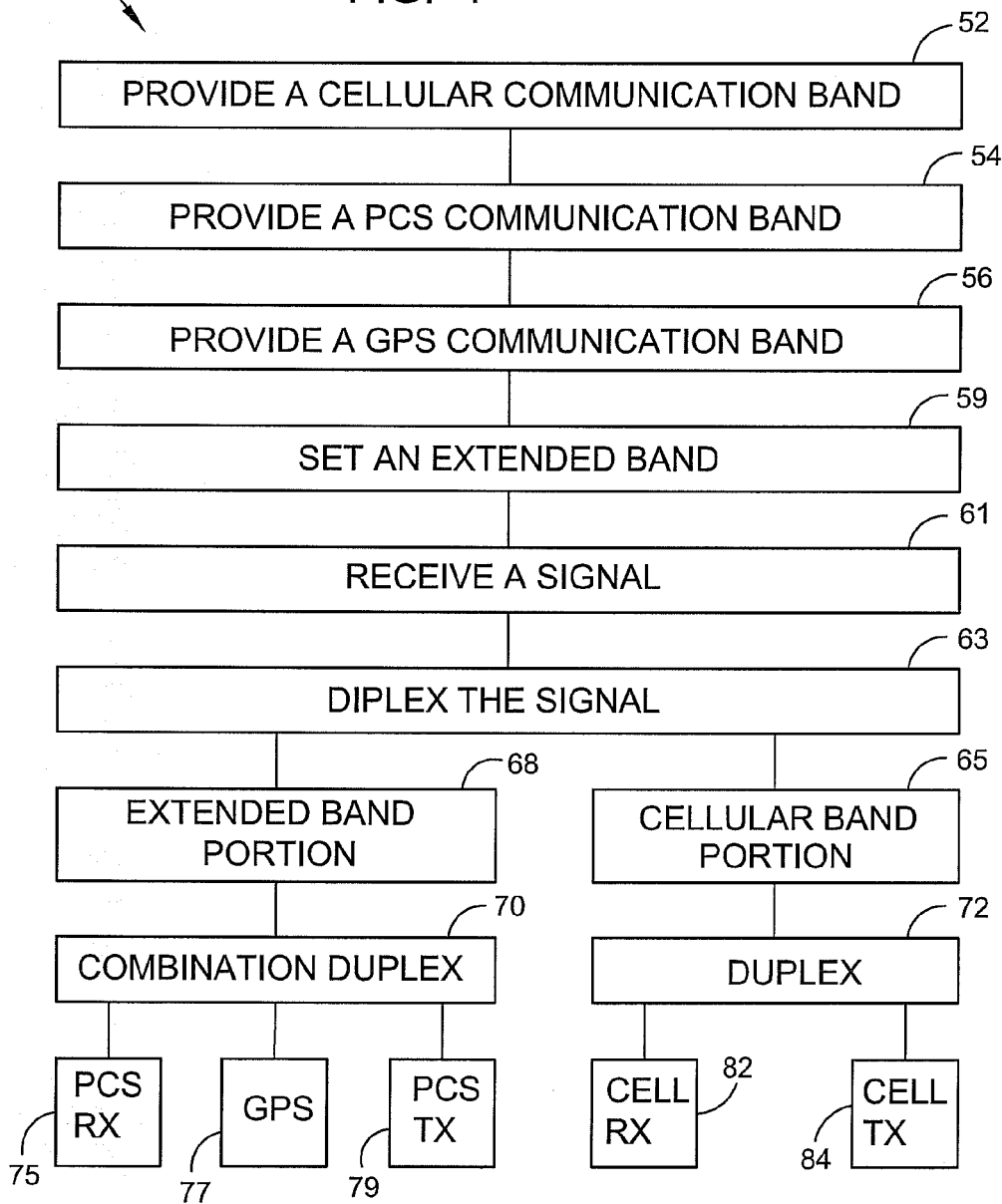
FIG. 2 is a flowchart of method of selecting a communication band in accordance with the present invention.

Referring now to FIG. 2, a method 50 for selecting a communication band is illustrated. Although FIG. 2 is described in terms of a PCS, cellular, and GPS signals, it will be appreciated that other communication bands and other auxiliary signals are within the scope of this disclosure. Method 50 provides a cellular communication band 52. The cellular communication band operates at approximately 800 MHz and is widely used for both voice and data communications. Method 50 also provides a PCS communication band. The PCS communication band operates at approximately 1900 MHz and is also widely used for carrying voice and data information. Method 50 also provides a GPS communication band. The GPS communication band operates at approximately 1575 MHz and is a satellite based position location system. An extended band 59 is defined that includes the PCS communication band and the GPS communication band. For example, this may mean that the extended band would extend from about 1500 MHz to about 2000 MHz. It will be appreciated that the high and low cut-off points for the extended band may be adjusted for specific needs and to accommodate specific circuitry In block 61 a signal is received into a wireless communication device, preferably using an antenna. The received signal passes through a wide band diplexer in block 63. The wide band diplexer provides for an extended band path 68 and a cellular band path 65. The extended band path 68, which may include a PCS communication signal or the GPS communication signal, is then coupled to a combination duplexer 70. The combination duplexer provides a GPS signal port 77, a PCS receive signal port 75, and a PCS transmit signal port 79 for accepting a PCS transmit signal. The cellular band path 65 connects to a standard cellular duplexer 72, which provides a cellular receive signal 82 and enables a cellular transmit signal 84.

Figure 3:
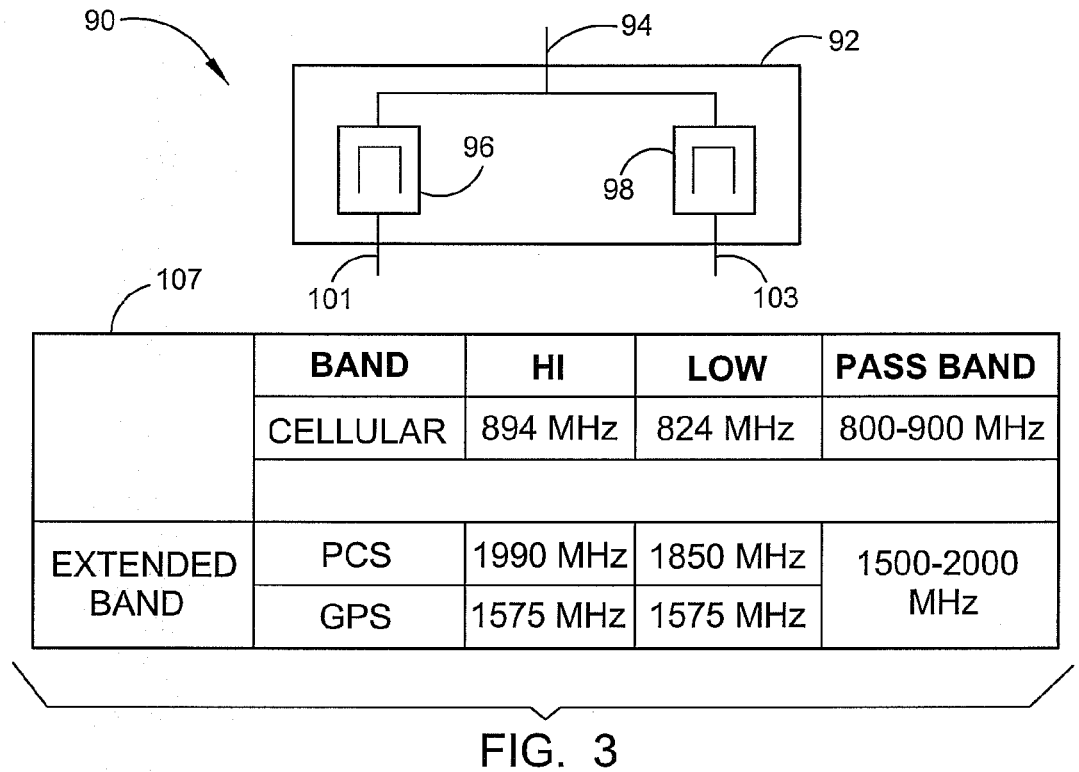
FIG. 3 is a block diagram of a wideband diplexer in accordance with the present invention.

Referring now to FIG. 3, a wide band diplexer 90 is illustrated. The wide band diplexer includes a diplexer 92 having an antenna port 94. The antenna port 94 provides for a two-way communication path with an antenna, such as a dual band antenna. The antenna port couples to two communication paths. The first path passes through filter 98 and provides an extended band port 103. The second path passes through filter 96 and provides a cellular band port 101. Filter 98 is configured to pass a PCS communication signal and any GPS communication signal. As shown in table 107, the PCS communication band operates between 1850 MHz and 1990 MHz, and the GPS communication signal operates at approximately 1575 MHz. Accordingly, the extended band needs to pass, with acceptable attenuation, signals between 1575 MHz and 1990 MHz. Therefore, filter 98 may be constructed to pass signals from between about 1500 MHz and 2000 MHz. It will be appreciated that different high and low cutoff frequencies may be used for the pass band. Further, filter 98 may alternatively be constructed as a high pass filter, where signals below about 1500 MHz are substantially attenuated.

Filter 96 is also configured as a pass band filter to pass the cellular communication band signal. As shown in table 107, the cellular band operates between 824 MHz and 894 MHz, and therefore the pass band should be set between about 800 to 900 MHz. It will be appreciated that other high and low cutoff frequencies may be used for specific applications and for specific circuitry. Further it will be appreciated that filter 96 may be constructed as a low pass filter for passing signals below about 900 MHz. Although wideband diplexer 92 is configured to provide a separation between the PCS/GPS extended band and the cellular band, it will be appreciated that other signal bands may be used. For example, another auxiliary signal frequency may be used, or other communication bands may be selected.

Figure 4:
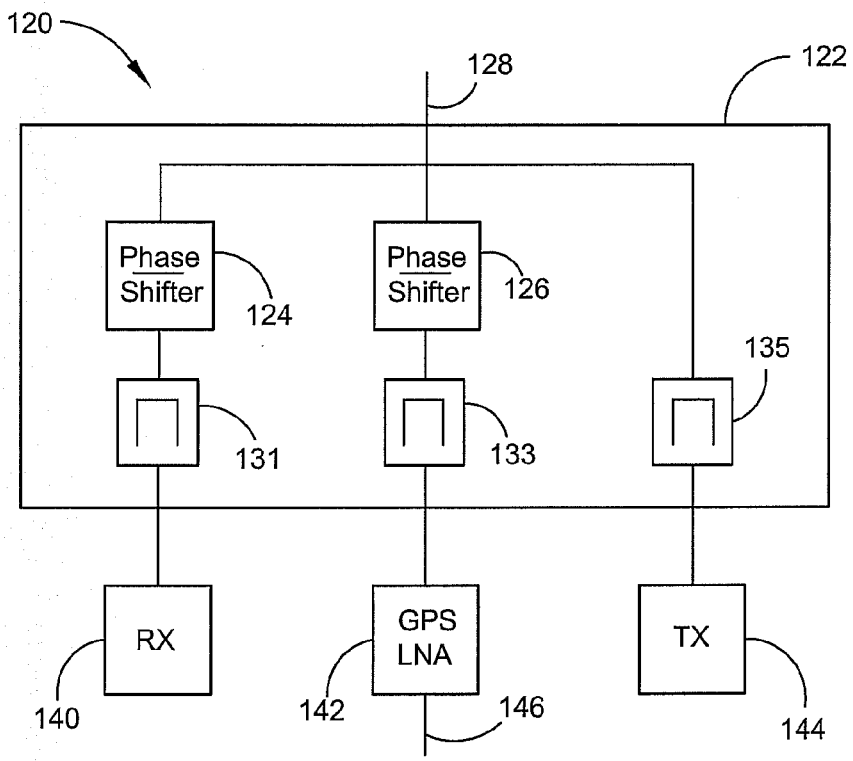
FIG. 4 is a block diagram of a combination duplexer in accordance with the present invention.

Referring now to FIG. 4, a combination duplexer 120 is illustrated. The combination duplexer 120 includes a duplexer component 122. The component 122 includes a connection port 128 for connection to other circuitry. For example, the combination duplexer 120 may be connected to an extended band port from a diplexer such as diplexer 90. Alternatively, the combination duplexer may be connected to an antenna, for example, through an RF switch. The combination duplexer 120 provides three communication paths. A first path extends from the connection port 128 through filter 133, which passes a GPS information signal. A second path extends from then connection port 128 through filter 135 for passing a PCS transmit signal. A third path extends from the connection port 128 through filter 131 for passing a PCS receive signal.

GPS filter 133 is constructed to pass the GPS signal, which operates at approximately 1575 MHz. The transmit filter 135 is constructed to pass the transmit frequencies of the PCS band, while the receive filter 131 is constructed to pass the receive frequencies of the PCS band. It will be appreciated that the paths may be tuned to reduce leakage and other losses. In this regard, phase shift networks 124 and 126 may be inserted into the GPS and RX communication paths for tuning the effective length of the communication paths. As an alternative, the phase shift networks could be inserted into the GPS and TX communication paths. It will be appreciated that the phase shift networks may be constructed using known techniques, and may include, for example, a quarter wave phase shifter. It will also be appreciated that the phase shift network may be used in one, two, or three of the communication paths, and a single phase shift network may be constructed to accommodate multiple communication lines. The output from GPS filter 133 may be received directly into a GPS low noise amplifier 142, which amplifies the GPS information signal into an amplified GPS informational signal 146. The amplified GPS informational signal may then be used by additional circuitry for processing position location information. Advantageously, in many circuit designs there will be no need for a separate SAW or other filter in the GPS signal path.

The output from receive filter 131 is received into additional receive circuitry 140 for converting the received signal into a voice or informational signal for use by the wireless device. The wireless device also has transmit circuitry 144 for generating a signal which is then passed through transmit filter 135 and out connection port 128. In this way, the combination duplexer 120 enables a single passive component to provide a PCS receive path, a PCS transmit path, and a GPS path for a single connection port. Although the specific example in FIG. 4 uses PCS as a communication band and GPS as the auxiliary signal, it will be appreciated that other communication bands and auxiliary signals may be substituted.

Figure 5:
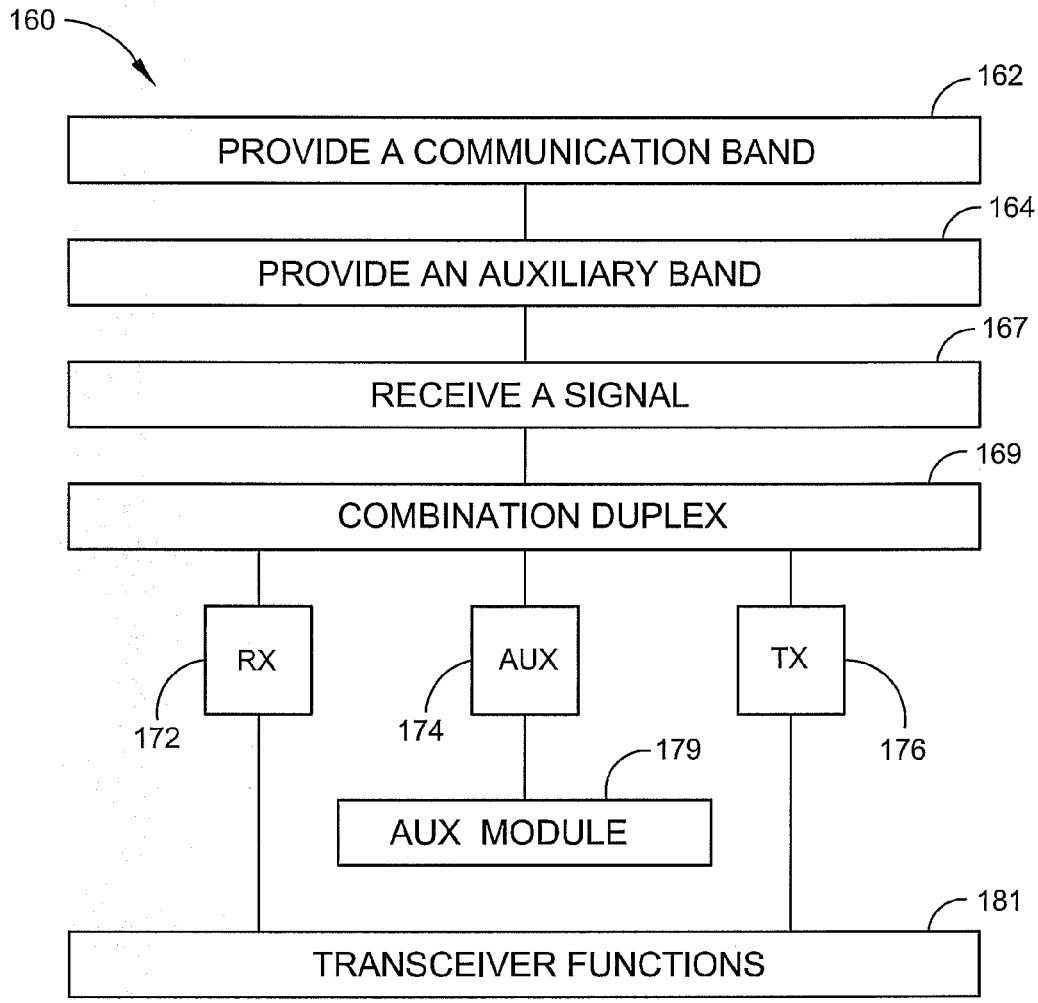
FIG. 5 is a flowchart of a method for receiving an auxiliary signal in accordance with the present invention.

Referring now to FIG. 5 a method 160 for receiving an auxiliary signal is shown. Method 160 provides a communication band 162. This communication band can be for example, the PCS communication band operating at approximately 1900 MHz. The method 160 also provides an auxiliary band 164, which may be the GPS communication band operating at approximately 1575 MHz. A signal is received 167 at the wireless device, preferably at an antenna. The signal may be preprocessed to separate other communication bands or further condition the signal. A combination duplexer 169 separates an auxiliary signal such as a GPS signal, from the signal in block 174. The auxiliary signal may then be passed to an auxiliary module 179 where additional processing may be done on the auxiliary signal. For example, if the auxiliary signal is a GPS signal then additional position location information processing may be done. The combination duplexer also provides a receive path 172 and a transmit path 176 for coupling with a transceiver function 181. The transceiver function 181 cooperates with additional circuitry for effecting two-way communication with a communication system.

With the combination duplexer generally described, specific implementations will now be discussed. The combination duplexer described in FIG. 4 may be constructed using alternative techniques. For example, the combination duplexer may be structured as a monoblock ceramic device, or a multi-layer ceramic device. Further, if the combination duplexer is constructed as a multi-layer ceramic device, the individual filters in the device may be arranged as SAW filters, or alternatively as FBAR filters. Alternative structures for the combination duplexer will be discussed with reference to FIG. 6, FIG. 7, and FIG. 8.

Figure 6:
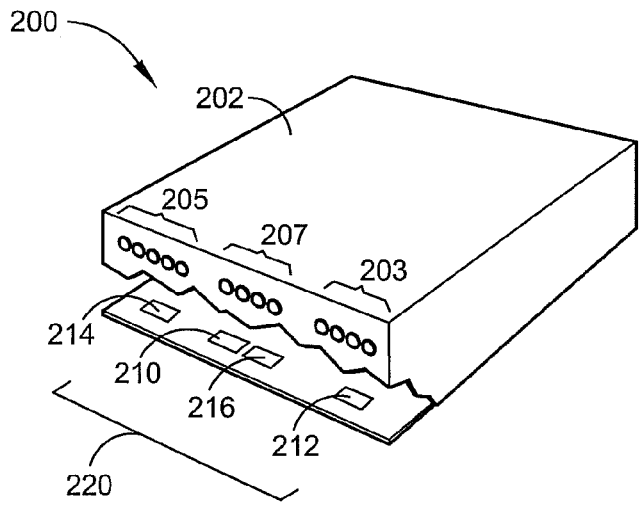
FIG. 6 is a monoblock combination duplexer in accordance with the present invention.

Referring now to FIG. 6, a ceramic monoblock construction for a combination duplexer 200 is described. The combination duplexer 200 is constructed to provide an auxiliary signal port, a communication receive port, and a communication transmit port. The ceramic monoblock block combination duplexer 200 includes a ceramic block 202 having multiple filter sections. Each of the filter sections comprises one or more resonators integral to the ceramic block. The resonators cooperate with associated circuitry to provide specific filter characteristics. For example, the transmit filter 205 comprises a set of axially arranged resonators, each filled with a conductor such as silver. In one construction, the ceramic block 202 has been builtup or pressed to include integrally formed filter circuitry. In another example, the ceramic monoblock may be metalized, and additional filter circuitry disposed on a face of the monoblock. The general construction techniques for building a ceramic monoblock device are well known and will not be described in detail here. Further, the fabrication and design of filters having specific frequency response characteristics is also well known and will not be described in detail here.

The ceramic block 202 has a receive portion 203 adjacent to one side of the ceramic block 202 and a transmit portion 205 adjacent the opposite side of the ceramic block 202. The receive portion 203 and the transmit portion 205 are spaced apart a distance 220. Distance 220 is greater than the distance of separation in a typical duplexer. The additional distance 220 increases the isolation between the receive portion and the transmit portion thereby contributing to advantageous performance characteristics. The increased distance 220 also provides additional space between the receive portion and the transmit portion. An auxiliary portion 207 is placed between the receive portion 203 and the transmit portion 205. The auxiliary portion is used for providing the auxiliary signal, such as the GPS location signal.

The ceramic block also contains several connection ports for sending and receiving signals from the combination duplexer 200. A connection port 210 may couple to an antenna and provide for two-way communication. When an auxiliary signal is present in the signal received in the connection port 210, the auxiliary signal will be received at the auxiliary port 216. For example, when a GPS signal is received at the antenna and passed through the connection port 210, the GPS signal will be available at port 216. When the antenna is receiving a communication signal in the appropriate communication band, the receive portion of the communication signal will be available at the receive port 212. The transmit port 214 is arranged to receive a transmit signal from a transmitter and pass the signal through to the connection port 210 where it will be transmitted through the antenna. The monoblock is grounded using known construction techniques. It will be appreciated that additional grounding, shielding or other structures may be added for specific applications. The monoblock shown in FIG. 6 is for illustration and description purposes only, and the relative number of resonators, materials, lengths, and spacing will vary according to known design principles.

Advantageously, the combination duplexer 200 is economically fabricated and provides a GPS port, a communication receive port, and a communication transmit port in a single ceramic block. In this way, space and cost are reduced as traditional components for auxiliary signal detection are eliminated, noise is minimized since the combination diplexer is a passive device, and performance is enhanced as the receive and transmit filters are farther apart for improved isolation.

Figure 7:
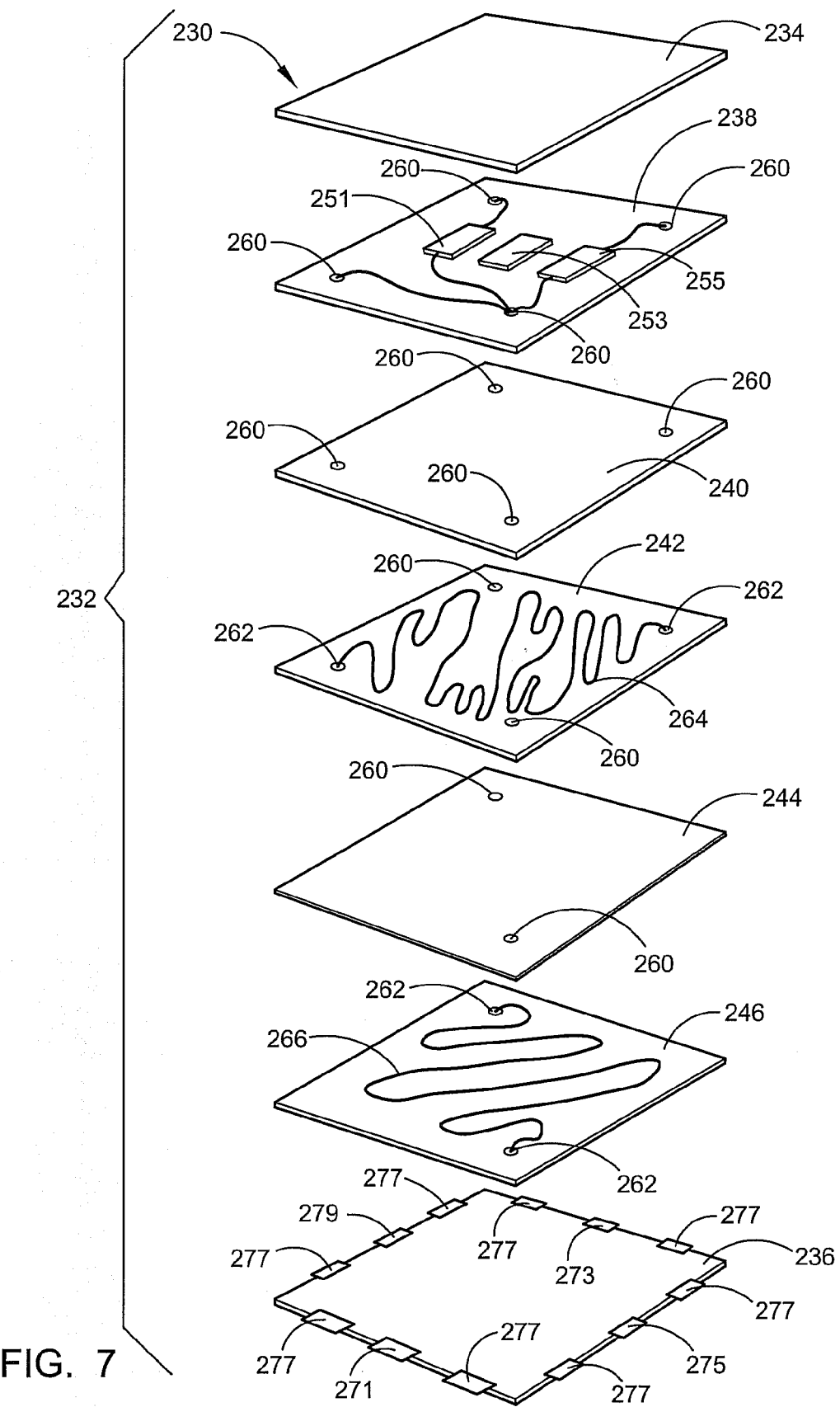
FIG. 7 is a multi-layer ceramic combination duplexer in accordance with the present invention.

Referring now to FIG. 7, another structure for a combination duplexer is shown. Combination duplexer 230 is constructed as a multi-layer ceramic package 232 The general construction techniques for a multi-layer ceramic package are well known and will not be described in detail. The multi-layer ceramic package includes a lid 234 and a base 236. Between the lid 234 and the base 236 are multiple ceramic layers. One of these layers may be a filter layer 238 where multiple filters for the combination duplexer may be constructed. The combination duplexer is preferable constructed with three filters. Filter 251 may be configured to pass the receive frequencies of the communication band while filter 255 may be constructed to pass the transmit frequencies of the communication band. Filter 253 may be constructed to pass the auxiliary signal. In one embodiment each of the filters 251, 253 and 255 are constructed as a SAW (surface acoustic wave) filter. These filters may be constructed using known techniques, and may be formed using a single or multiple dies. A SAW filter is a filter structure having a piezoelectric crystal base with a set of interdigital conductors disposed on the crystal. An incoming electric signal is converted into acoustic waves. The acoustic waves are transmitted across the surface of the crystal, which are converted back to an electrical signal at the other end. The particular construction of the interdigital conductors enables the SAW filter to reject and pass specific frequency bands. The construction and design of SAW filters is well known and will not be described in detail herein.

As described earlier one or more of the communication paths in the combination duplexer may benefit from tuning. In the multi-layer ceramic package, tuning may accomplished using a coil disposed on a particular layer, although it will be appreciated that other tuning structures may be substituted. For example, coil layer 242 has copper coil 264 printed on its surface. It will be appreciated that other conductors may be used, such as gold or silver. The specific length and pattern of the coil provides specific performance characteristics for tuning a communication path to a desired effective length. The coil ends in connection pads 262, which couple through via holes 260 for connection to the filter and other circuitry. If a second tuning coil is needed, then an additional coil layer 246 may be used. Coil layer 246 has copper coil 266 arranged orthogonally to the coils on layer 242 to reduce interference. It will be appreciated that other configurations may be used between coils. Coil 266 also connects through via holes to one of the filters and to additional circuitry. Separation layers 240 and 244 are used to separate the filter and coil layers. It will be appreciated that the thickness of the separation layers may be adjusted to provide additional isolation and separation. In another example of adding a second tuning structure, two tuning structures may be added to a single tuning layer, provided the tuning structures can be sufficiently separated and isolated.

The multi-layer ceramic package is provided with ports for connection to other circuitry. For example, the package 242, has an antenna port 271 for connecting to an antenna, a GPS port 273 for connection to GPS circuitry, a receive port 279 and a transmit port 275 for connection to additional transceiver circuitry, and one or more ground ports 277 for grounding the device. The device of FIG. 7 is shown using a standard 12-pin port structure. Using the 12-pin configuration enable the combination duplexer to more easily be integrated into existing designs for wireless devices. Alternatively, another port structure could be used, such as an 8-pin structure. In the 8-pin structure, a pinout is provided at each corner of the component, with corner pins used for the antenna port, the RX port, the TX port, and the GPS port. Between each corner pin is a ground pad. It will be understood that other pin constructions may be used.

Figure 8:
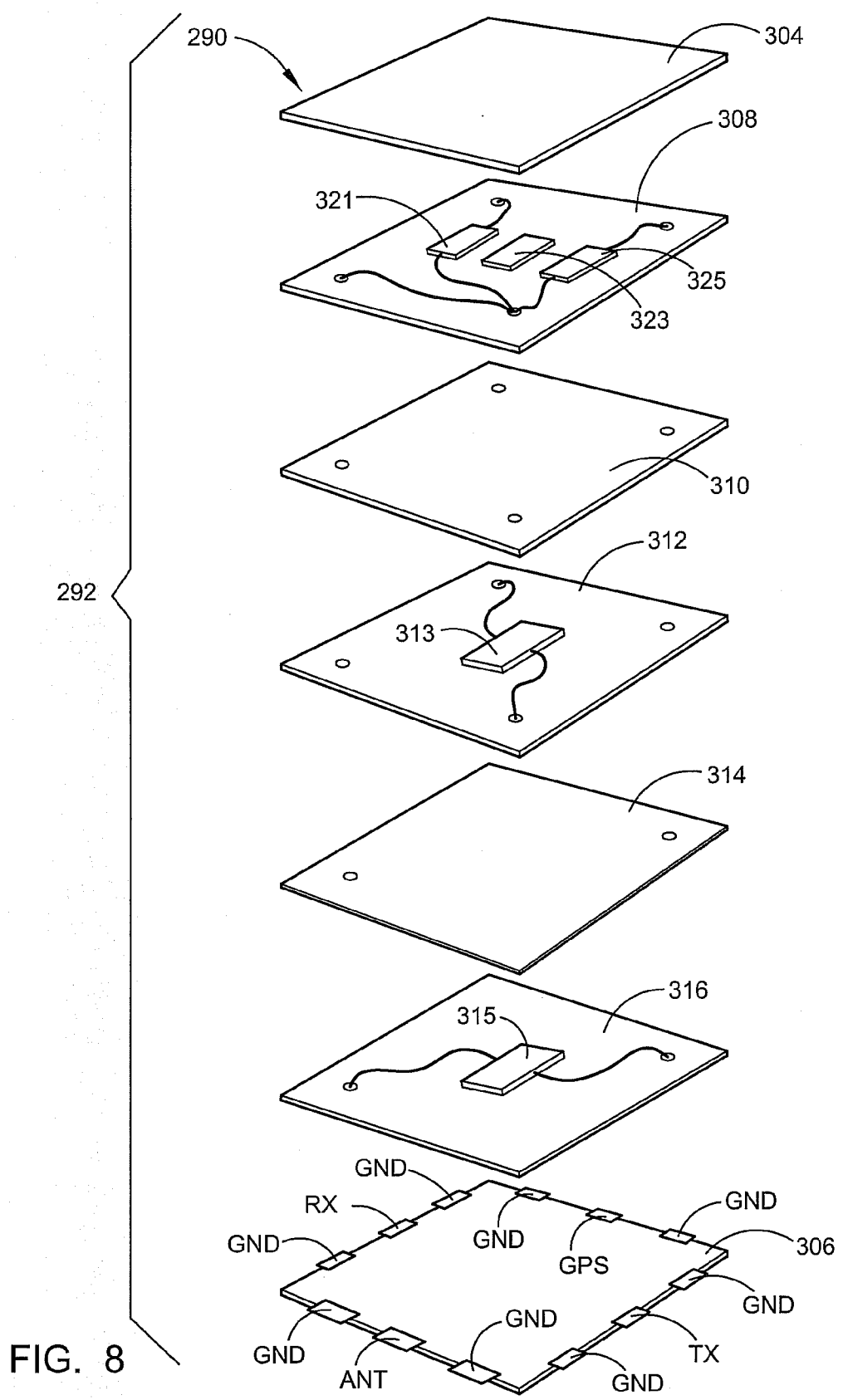
FIG. 8 is a is another multi-layer ceramic combination duplexer in accordance with the present invention

Referring now to FIG. 8, another structure for the combination duplexer is described. Combination duplexer 290 is similar to combination duplexer 230 described in FIG. 7, so less detail may provided while discussing FIG. 8. Combination duplexer 290 is also a multi-layer ceramic package 292 having a lid 304 and a base 306. Several additional layers are included such as a filter layer 308 a tuning layer 312, tuning layer 316 and separation layers 310 and 314. The combination duplexer 290 also includes connection ports such as an antenna connection port, a GPS port, a transmit port, and a receive port. Although combination duplexer 290 is similar to combination duplexer 230, it will be appreciated that the specific implementation may require different ceramic material, different construction of tuning structures, and other configuration modifications.

In combination duplexer 290 the filter layer 308 includes a receive filter 321, a transmit filter 325, and an auxiliary GPS filter 323. Each of the three filters is constructed using an FBAR (film bulk acoustic resonator) filter. An FBAR filter is constructed from a piezoelectric material and accepts an electrical signal at one end. The piezoelectric material converts the electrical signal into acoustical waves, which resonate through the film material. At the other end the acoustic waves are converted back to electrical energy. By manipulating the characteristics of the piezoelectric structure, the FBAR filter may be adjusted to have specific frequency characteristics. As compared to the SAW filter used in combination duplexer 230, the FBAR filters may be constructed in a more compact form. However, the FBAR filter passes more out-of-band energy, and therefore additional circuitry may be needed for rejecting these unwanted signals.

Since the FBAR filter has different electrical and frequency characteristics than the SAW filter used in FIG. 7, the tuning structures 313 and 314 are adapted to the FBAR filter. It will be appreciated that tuning structures for FBAR filters are readily commercially available, so will not be discussed in detail here. Also, it will be appreciated that the tuning structures may be constructed on a single tuning layer provided that the tuning structures are placed to provide sufficient separation and isolation.

Figure 9:
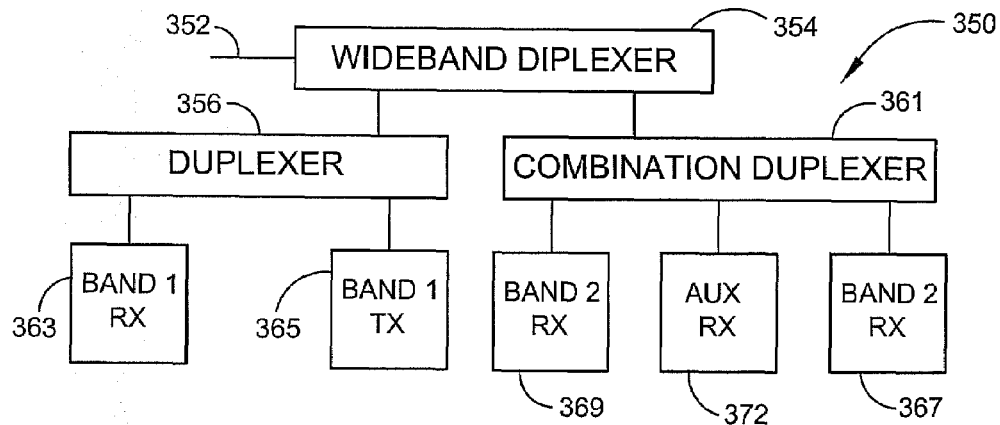
FIG. 9 is a block diagram of a band selection system in accordance with the present invention.

Referring now to FIG. 9 a band selection system 350 is illustrated. Band selection system 350 operates in a wireless communications device. The wireless communication device could be, for example, a mobile wireless unit for communicating in a communication system. For increased flexibility, a mobile wireless device is often adapted to operate on more than one communication band. For example, a wireless mobile phone may be enabled to place and receive calls on either a first band or a second band. The mobile wireless device not only may operate on multiple communication bands, but the mobile wireless device may also need to receive an auxiliary signal, such as a signal indicating position location of the presence of another communication system. Accordingly, the band selection system 350 enables a wireless communication device to efficiently select a communication band and receive an auxiliary signal.

The band selection system 350 has an antenna port 352 coupled to an antenna (not shown). The antenna is constructed to receive signals at the expected frequencies of the available communication bands. For example, the antenna may be a dual-band antenna capable of receiving a first band signal and a second band signal. The antenna port 352 is coupled to a wide band diplexer 354. The wide band diplexer enables two communication paths from the antenna port. A first path couples the wide band diplexer 354 to a combination duplexer 361. The first path carries a wide band signal that may include a first communication signal and an auxiliary signal. The combination duplexer separates the wide band signal into a first-band receive path 367 and a first-band transmit path 369. The first-band receive path 367 and the first-band transmit path 369 then couple to other transceiver circuitry for receiving and transmitting on the first-band band. Of course, communicating on the first-band band requires the presence of a compatible first-band base station and communication system. The combination duplexer also provides a auxiliary output 372. The auxiliary output 372 contains auxiliary information received from a auxiliary communication signal, if the antenna detects a auxiliary signal of sufficient strength. The auxiliary output 372 may couple to a auxiliary low noise amplifier for generating an amplified auxiliary informational signal. The auxiliary signal may also be used by other processing or control circuitry.

The second path from the wide band diplexer 354 is received into a second-band duplexer 356. The second-band duplexer provides a second-band received path 363 and a second-band transmit path 365. The second-band received path 363 and the second-band transmit path 365 couple to additional transceiver circuitry for receiving and transmitting second-band communications. Of course, communicating on the second-band requires the presence of a compatible second-band base station and communication system.

Advantageously, the band selection system 350 may be efficiently and compactly implemented. The band selection system 350 also exhibits low insertion loss and has superior noise characteristics. For example, since the wide band diplexer 354, the combination duplex 362, and the cellular duplexer 356 are all passive devices, these devices add no significant additional noise to any communication signal. Accordingly, band selection system 350 is useful for constructing wireless devices having highly advantageous performance characteristics and lower costs as compared to standard device construction.

Figure 10:
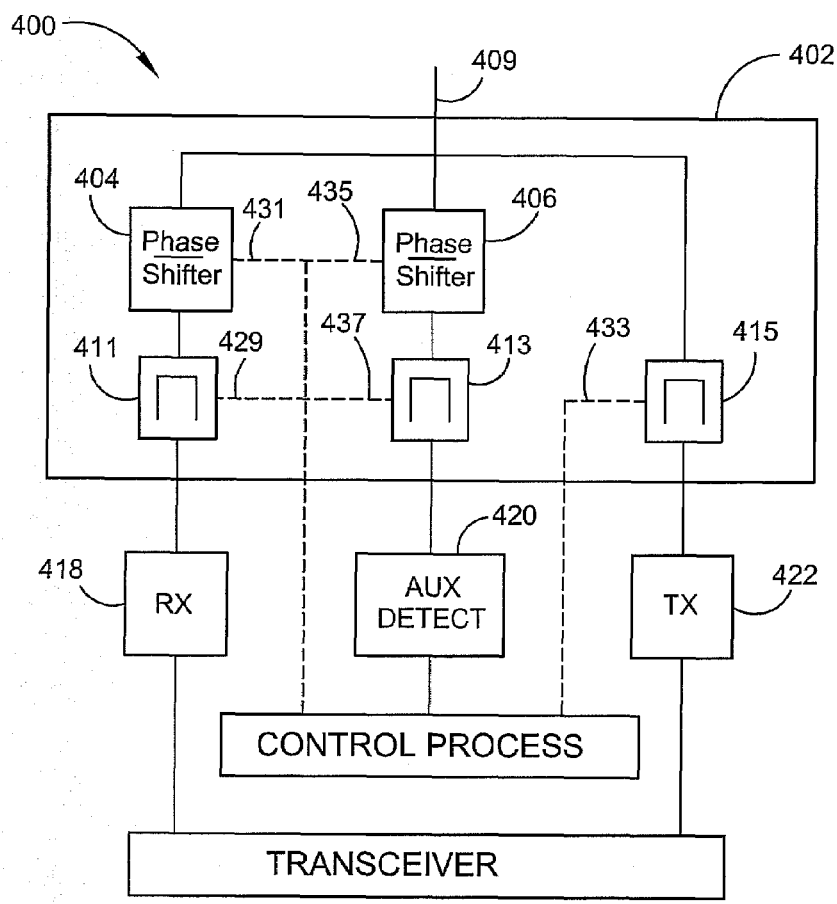
FIG. 10 is a block diagram of a combination duplexer in accordance with the present invention.

Referring now to FIG. 10 a combination duplexer system 400 is shown. Combination duplexer 400 includes a combination duplexer 402. The combination duplexer 402 is similar to the combination duplexer 120 described in FIG. 4, and therefore will not be described in detail here. The combination duplexer 402 includes the connection port 409 providing three communication paths. The first communication path has a phase shift network 404 and a receive filter 411 for coupling to receive circuit 418. A second communication path includes phase shift network 406 and auxiliary filter 413 for connection to auxiliary detect circuitry 420. A third communication path includes transmit filter 415 which connects to a transmit circuit 422. As an alternative it will be appreciated that the phase shift network could be inserted into the TX path. As previously described, the combination duplexer may be used to receive a GPS signal and to provide receive and transmit ports for a PCS communication band. It will be appreciated that other auxiliary signals and other communication bands may be used. For example, the auxiliary detect may be used to detect the presence of another communication system. Such a system may be, for example, a bluetooth communication system, an IEEE 802.11 system or an IEEE 802.15.4 communication system. It will be appreciated that the filter 413 would be adjusted to pass the specific signal indicative of the presence of these alternative communication systems.

In one example of the combination duplexer 402, the transmit filter 415 and the receive filter 411 have adjustable frequency characteristics. Such a frequency agile filter maybe implemented using techniques and structures disclosed in U.S. patent application Ser. No. 09/927,732, entitled "Low Loss Tunable Ferro-Electric Device and Method of Characterization" and filed Aug. 8, 2001 This application teaches a structure and method for using ferroelectric film to change the frequency response of a filter. It will also be appreciated that more conventional means may be used for adjusting the frequency characteristics of filters 411 and 415. Once the auxiliary detect circuitry has detected an auxiliary signal, the control process 424 may send control signals via control line 429 and control line 433 to adjust the frequency characteristics of filters 411 and 415 respectably. For example, if the auxiliary detect 420 detects an 802.15.4 signal operating at about 2400 MHz, then the control process may send control signals to the filters to change the frequency response of the receive and transmit filters to operate at the frequency specification for the 802.15.4 standard. In another example, the receive and transmit filters may be constructed to receive and transmit on the cellular communication band. The auxiliary detect 420 may detect the presence of an 802.11 signal, which may be operating at approximately about 900 MHz. The control process 424 may then adjust the filters to have a new frequency response for transmitting and receiving an 802.11 signal. It will also be appreciated that the control process 424 may control the frequency response of the phase shift networks through the control lines 431 and 435.

Figure 11:
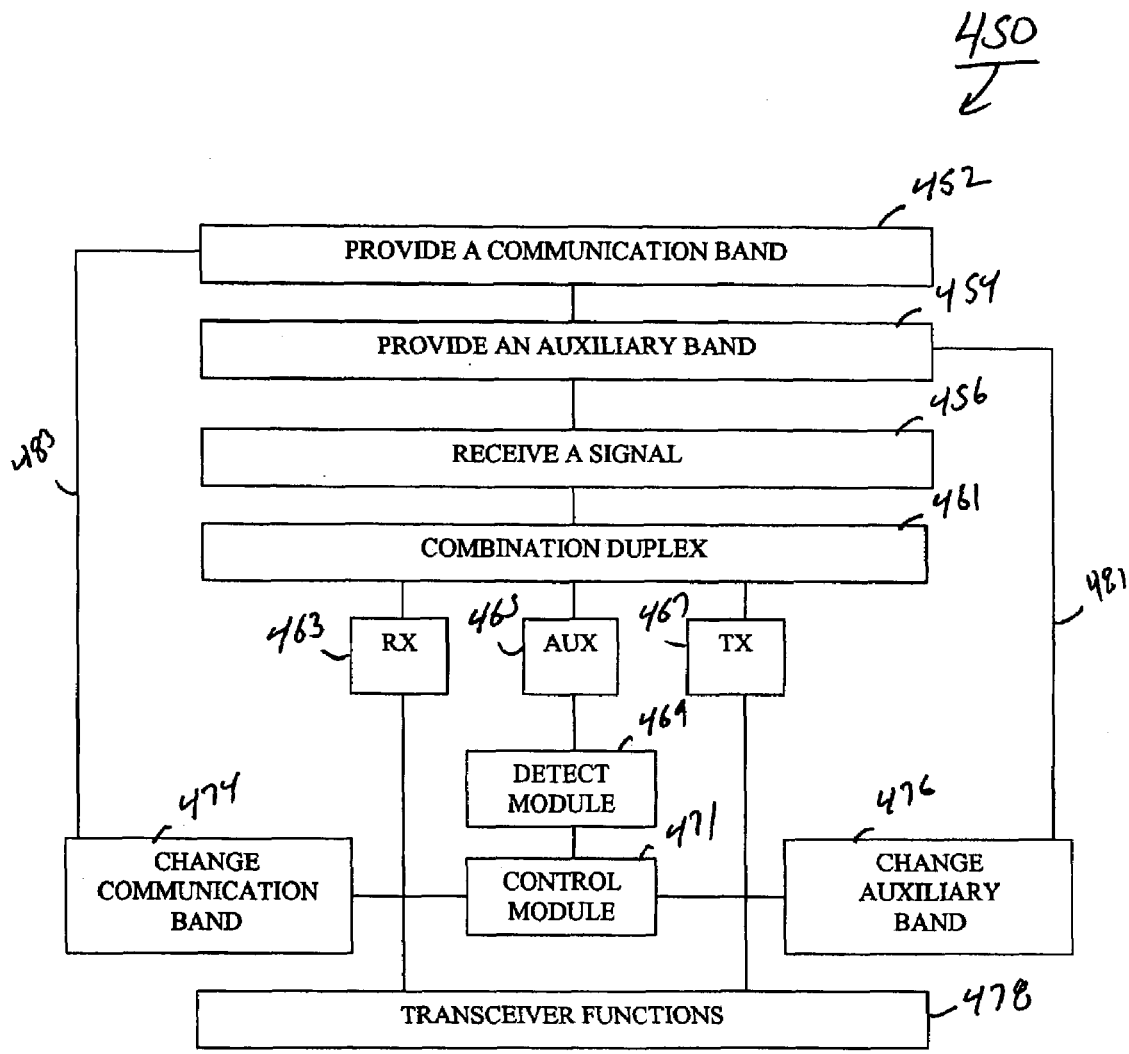
FIG. 11 is a flowchart of method of selecting a communication band in accordance with the present invention.

Referring now to FIG. 11 a method for band selection 450 is shown. Method 450 provides a communication band 452. The communication band could be, for example, a PCS or other communication band. Method 450 also provides an auxiliary band 454. The auxiliary band may be for example a GPS band operating at about 1575 MHz. A signal is received in block 456, which may include a communication band signal or an auxiliary signal. The received signal is passed to a combination duplexer 461 where the received signal is separated into three communication paths. A first communication path includes the received signal 463 for the communication band, while another communication path carries any transmit signal 467 for the communication band. The third communication path includes the auxiliary signal 465.

The auxiliary signal 465 may be passed to a detect module 469 where additional processing may be done on the auxiliary signal. The receive path 463 and the transmit path 467 connect to additional transceiver functions 478 for providing communication on a communication system. In one aspect of method 450, the control module 471 can pass an instruction to a change module 474 for adjusting the communication bands in block 452. In this way, responsive to the particular auxiliary signal received, the method 450 can adjust which communication band will be used for the receive path 463 and the transmit path 467. For example, if the detect module 469 detects that an 802.11 signal is present, then the control module could instruct the change communication module 474 to change the communication band to the 802.11 band. In this way, the receive path 463 and the transmit path 467 may be modified to operate at the 802.11 band. It will be appreciated that different bands may be substituted.

In another example, the control module 471 may instruct a change auxiliary band module 476 to change the auxiliary band 454. For example, if the method 450 is searching for an 802.11 signal, and the auxiliary detect module 469 does not find one, then the control module 471 may instruct the change auxiliary band 476 to look for another auxiliary signal, such as a bluetooth signal. Accordingly, the auxiliary band of 454 would be changed to the bluetooth band and the auxiliary path 465 would be configured to look for and detect a bluetooth signal. It will be appreciated that many other auxiliary signals may be substituted.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A communication band selection system operating in a communication system where a communication signal may include a PCS communication signal, a cellular signal, or a GPS communication signal, the selection system comprising:
   a wideband diplexer coupled to an antenna and constructed to pass a wideband signal and to pass the cellular communication signal;
   a combination duplexer coupled to the wideband diplexer and constructed to receive the wideband signal from the combination duplexer;
   a GPS receive port on the combination duplexer for providing a GPS signal indicative of the GPS communication signal, the combination duplexer also providing a PCS receive port and a PCS transmit port; and
   a cellular duplexer coupled to the wideband diplexer and constructed to provide a cellular receive port and a cellular transmit port.

2. The communication band selection system according to claim 1 further including a low noise amplifier coupled to the GPS receive port and generating an amplified GPS signal.

3. A communication band selection system operating in a communication system where a communication signal may include a first-band communication signal, a second band communication signal, or an auxiliary band communication signal, the selection system comprising:
   a wideband diplexer coupled to an antenna and constructed to pass a wideband signal and to pass the second-band communication signal;
   a combination duplexer coupled to the wideband diplexer and constructed to receive the wideband signal from the combination duplexer;
   an auxiliary-band receive port on the combination duplexer for providing an auxiliary signal indicative of the auxiliary band communication signal, the combination duplexer also providing a first-band receive port and a first-band transmit port; and
   a second-band duplexer coupled to the wideband diplexer and constructed to provide a second-band receive port and a second-band transmit port.

4. The communication band selection system of claim 3 wherein the wideband diplexer is constructed to receive the first-band communication signal as a PCS-band communication signal.

5. The communication band selection system of claim 3 wherein the wideband diplexer is constructed to receive the second-band communication signal as a cellular-band signal.

6. The communication band selection system of claim 3 wherein the wideband diplexer is constructed to receive the auxiliary-band communication signal as a GPS signal, and the auxiliary-band receive port is configured to provide a signal indicative of the GPS signal.

7. The communication band selection system of claim 3 wherein the wideband diplexer is constructed to receive the auxiliary-band communication signal as a bluetooth signal, and the auxiliary-band receive port is configured to provide a signal indicative of the bluetooth signal.

8. The communication band selection system of claim 3 wherein the wideband diplexer is constructed to receive the auxiliary-band communication signal as an 802.11 signal, and the auxiliary-band receive port is configured to provide a signal indicative of the 802.11 signal.

9. The communication band selection system of claim 3 wherein the wideband diplexer is constructed to receive the auxiliary-band communication signal as a 802.15.4 signal, and the auxiliary-band receive port is configured to provide a signal indicative of the 802.15.4 signal.

10. The communication band selection system of claim 3 wherein the wideband diplexer is constructed to receive the auxiliary-band communication signal as a third-band communication signal, and the auxiliary-band receive port is configured to provide a signal indicative of the third-band signal.

11. The communication band selection system of claim 3, wherein the selection system is constructed to operate in a battery-powered portable device.

12. The communication band selection system of claim 3, wherein the selection system is constructed to operate in a mobile wireless device.

13. The communication band selection system of claim 3, wherein the selection system is constructed to operate in a mobile wireless phone.

14. A method of selecting a band in a communication system, comprising,
   defining a first communication band, a second communication band, and an auxiliary communication band;
   defining an extended band to include the first communication band and the auxiliary communication band;
   receiving a communication signal, the communication signal including a first-band communication signal, a second-band communication signal, or an auxiliary communication signal;
   diplexing the communication signal into 1) an extended band signal path that carries any first-band communication signal and any auxiliary communication signal, and 2) a second-band signal path that carries any second-band communication signal;
   duplexing the extended band signal path into an auxiliary signal path, a first-band receive path, and a first-band transmit path; and
   duplexing the second-band signal path into a second-band receive path and a second-band transmit path.

15. The method of claim 14 wherein the first communication band is a PCS band, the second communication band is a cellular band, and the auxiliary communication band is a GPS signal band.

* * * * *